(12) United States Patent
Papke et al.

(10) Patent No.: US 10,370,106 B2
(45) Date of Patent: Aug. 6, 2019

(54) CONTOURED CLASS DIVIDER

(71) Applicant: B/E AEROSPACE, INC., Winston-Salem, NC (US)

(72) Inventors: Robert Papke, Camano Island, WA (US); Shawn Claflin, Seattle, WA (US); Jefferey McKee, Duvall, WA (US); Trevor Skelly, Mercer Island, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 429 days.

(21) Appl. No.: 15/153,104

(22) Filed: May 12, 2016

(65) Prior Publication Data

US 2017/0283060 A1    Oct. 5, 2017

Related U.S. Application Data

(60) Provisional application No. 62/317,706, filed on Apr. 4, 2016.

(51) Int. Cl.
*B64D 11/00* (2006.01)

(52) U.S. Cl.
CPC .................................. *B64D 11/0023* (2013.01)

(58) Field of Classification Search
CPC ............ B64D 11/0023; B64D 11/0606; B64D 11/003; B64D 11/0619; B64D 11/0627
See application file for complete search history.

(56) References Cited

U.S. PATENT DOCUMENTS

| | | | |
|---|---|---|---|
| 2,268,927 A | 1/1942 | Demme | |
| 3,423,121 A | 1/1969 | Lipkin | |
| 4,861,103 A | 8/1989 | Vallee | |
| 4,899,962 A | 2/1990 | Mueller | |
| 5,133,587 A | 7/1992 | Hadden, Jr. | |
| 5,165,626 A * | 11/1992 | Ringger | B64D 11/0023 16/282 |
| 5,338,090 A | 8/1994 | Simpson et al. | |
| 5,340,059 A | 8/1994 | Kanigowski | |

(Continued)

FOREIGN PATENT DOCUMENTS

| | | |
|---|---|---|
| DE | 10322611 B3 | 8/2004 |
| DE | 10 2005 009 750 A1 | 9/2006 |

(Continued)

OTHER PUBLICATIONS

International Search Report and Written Opinion on International Application PCT/US2018/053617 dated Dec. 10, 2018. 19 pages.

(Continued)

*Primary Examiner* — Medhat Badawi
(74) *Attorney, Agent, or Firm* — Donna P. Suchy

(57) ABSTRACT

A contoured class divider for dividing an aircraft cabin according to a predetermined class arrangement and including a divider panel having a contour closely matching a contour of a forward-positioned seatback, and adapted for being positioned in closely spaced-apart relation to the seatback for providing additional space aft of the divider panel. At least one leg is provided for supporting the panel on an aircraft cabin deck. A viewing window is formed in the panel for providing the ability of a flight attendant to observe areas of the cabin.

16 Claims, 6 Drawing Sheets

(56) References Cited

U.S. PATENT DOCUMENTS

| | | | |
|---|---|---|---|
| 5,344,210 A | 9/1994 | Marwan et al. | |
| 5,350,144 A * | 9/1994 | Lary | A45D 20/12 |
| | | | 248/183.1 |
| 5,393,013 A | 2/1995 | Schneider et al. | |
| 5,482,230 A | 1/1996 | Bird et al. | |
| 5,573,304 A | 11/1996 | Glockl | |
| 5,577,358 A * | 11/1996 | Franke | B64D 11/0023 |
| | | | 244/118.5 |
| 5,649,721 A * | 7/1997 | Stafford | B60R 21/04 |
| | | | 244/118.5 |
| 5,716,026 A * | 2/1998 | Pascasio | B64D 11/00 |
| | | | 105/315 |
| 5,788,185 A * | 8/1998 | Hooper | B64D 11/0619 |
| | | | 244/118.6 |
| 5,816,534 A * | 10/1998 | Schumacher | B64D 11/0023 |
| | | | 244/119 |
| 6,523,779 B1 | 2/2003 | Michel | |
| 6,672,662 B1 * | 1/2004 | Balk | B60N 2/3013 |
| | | | 297/238 |
| 6,692,069 B2 * | 2/2004 | Beroth | A47C 1/0352 |
| | | | 244/118.6 |
| 7,083,146 B2 * | 8/2006 | Hiesener | B64D 11/00 |
| | | | 244/118.5 |
| 7,213,882 B2 * | 5/2007 | Dryburgh | A47C 1/0352 |
| | | | 297/354.13 |
| 7,905,451 B2 * | 3/2011 | Schotte | B64D 11/0023 |
| | | | 244/118.6 |
| 8,590,838 B2 * | 11/2013 | Cook | B64D 11/02 |
| | | | 244/118.6 |
| 8,960,602 B2 | 2/2015 | Neumann et al. | |
| 9,199,740 B2 * | 12/2015 | Ehlers | B64D 11/0691 |
| 9,327,836 B2 * | 5/2016 | Weitzel | B64D 11/06 |
| 9,352,839 B2 | 5/2016 | Gehret et al. | |
| 9,511,867 B2 * | 12/2016 | Schliwa | B64D 11/0691 |
| 9,650,146 B2 * | 5/2017 | Boenning | B64D 11/06 |
| 9,718,552 B2 | 8/2017 | Zheng et al. | |
| 9,868,528 B2 | 1/2018 | Mayer | |
| 10,106,187 B1 | 10/2018 | Farrar et al. | |
| 2003/0094837 A1 * | 5/2003 | Williamson | B60N 3/004 |
| | | | 297/163 |
| 2006/0006704 A1 * | 1/2006 | Skelly | B60N 2/62 |
| | | | 297/188.08 |
| 2007/0222266 A1 * | 9/2007 | Lucci | A47C 1/121 |
| | | | 297/331 |
| 2009/0200422 A1 * | 8/2009 | Johnson | B64D 11/0023 |
| | | | 244/118.5 |
| 2010/0078985 A1 * | 4/2010 | Mahoney | B32B 3/10 |
| | | | 297/446.1 |
| 2010/0255919 A1 * | 10/2010 | Kelly | A47D 13/105 |
| | | | 472/118 |
| 2011/0062283 A1 * | 3/2011 | Breuer | B64D 11/00 |
| | | | 244/118.5 |
| 2012/0292967 A1 * | 11/2012 | Cailleteau | A47C 7/446 |
| | | | 297/311 |
| 2013/0248651 A1 * | 9/2013 | Burrows | B64D 11/0023 |
| | | | 244/118.5 |
| 2014/0014774 A1 * | 1/2014 | Pozzi | B64D 11/06 |
| | | | 244/118.6 |
| 2014/0124623 A1 * | 5/2014 | Chandler | B64D 11/0023 |
| | | | 244/118.5 |
| 2014/0124624 A1 * | 5/2014 | Jacobsen | B64D 11/0023 |
| | | | 244/118.5 |
| 2014/0138986 A1 | 5/2014 | Tsuneyama et al. | |
| 2014/0158826 A1 * | 6/2014 | Young | B64D 11/02 |
| | | | 244/118.5 |
| 2014/0175219 A1 * | 6/2014 | Young | B64D 11/0023 |
| | | | 244/118.5 |
| 2014/0375090 A1 * | 12/2014 | Wegenka | B60N 2/242 |
| | | | 297/188.09 |
| 2015/0284084 A1 * | 10/2015 | Mayer | B64D 11/0023 |
| | | | 244/118.5 |
| 2015/0284085 A1 * | 10/2015 | McKee | B64D 11/02 |
| | | | 244/118.5 |
| 2016/0198864 A1 | 7/2016 | Yang | |
| 2016/0296419 A1 * | 10/2016 | Paulussen | A61H 31/006 |
| 2016/0297525 A1 * | 10/2016 | Walton | B64D 11/0023 |
| 2016/0304204 A1 * | 10/2016 | McKee | B64D 11/003 |
| 2017/0021929 A1 * | 1/2017 | McKee | B64D 11/0691 |
| 2017/0021933 A1 * | 1/2017 | Pozzi | B64D 11/0636 |
| 2017/0129608 A1 * | 5/2017 | Reams | B64D 11/0624 |
| 2017/0267350 A1 | 9/2017 | Heidtmann et al. | |
| 2017/0267353 A1 | 9/2017 | McIntosh et al. | |
| 2017/0283060 A1 * | 10/2017 | Papke | B64D 11/0023 |
| 2017/0283061 A1 * | 10/2017 | Papke | B64D 11/0606 |
| 2017/0283065 A1 * | 10/2017 | Papke | G09F 19/22 |
| 2018/0022457 A1 * | 1/2018 | Papke | B64D 11/0023 |
| | | | 244/118.6 |
| 2018/0222589 A1 * | 8/2018 | Papke | B64D 11/0606 |

FOREIGN PATENT DOCUMENTS

| | | | | |
|---|---|---|---|---|
| EP | 0 361 717 A1 | 4/1990 | | |
| EP | 1 698 552 A1 | 9/2006 | | |
| EP | 2 113 427 A2 | 11/2009 | | |
| EP | 2 727 836 A2 | 5/2014 | | |
| EP | 3 219 555 A1 | 9/2017 | | |
| EP | 3 219 601 A1 | 9/2017 | | |
| FR | 2877281 A1 | 5/2006 | | |
| GB | 93/01088 A1 * | 1/1993 | | B64D 11/00 |
| WO | WO-2018/071596 A1 | 4/2018 | | |

OTHER PUBLICATIONS

International Search Report and Written Opinion on International Patent Application No. PCT/US2016/032061 dated Dec. 7, 2016. 11 pages.

International Search Report and Written Opinion on International Patent Application No. PCT/US2017/056222 dated Feb. 26, 2018. 12 pages.

International Search Report and Written Opinion on International Patent Application No. PCT/US2018/025891 dated Jun. 1, 2018. 10 pages.

* cited by examiner

CONTOURED CLASS DIVIDER

CROSS-REFERENCE TO RELATED APPLICATIONS AND PRIORITY

This present application claims priority from and incorporates by reference the full contents of a provisional patent application filed on Apr. 4, 2016, Application No. 62/317,706.

TECHNICAL FIELD AND BACKGROUND OF THE INVENTION

The present invention relates to a contoured class divider providing enhanced legroom, carry-on stowage access and improved seat pitch. The invention addresses commercial aircraft multi-class cabin arrangements and how they can be efficiently separated from each other. One method to achieve division of the seat groups is by providing a hard divider between rows of seats attached to the aircraft seat tracks and an upper support element such as an overhead storage bin assembly.

To accomplish this intent and optimize the usable space between cabin classes, the contoured class divider according to this application is specifically designed to nest into the volume behind the seat body following the profile of the seatback while still allowing for adequate seatback recline. In addition, the form of the divider allows the seat immediately behind the contoured class divider to be located several inches closer to the seat forward of it, thus increasing the opportunity for increased seat pitch and passenger legroom in the cabin.

SUMMARY OF THE INVENTION

It is therefore an object of the present invention to provide a class divider for a commercial passenger aircraft.

It is a further object of the invention to provide a contoured class divider for a commercial passenger aircraft that nests into the volume behind the seat body following the profile of the seatback while still allowing for adequate seatback recline.

It is a further object of the invention to provide a contoured class divider for a commercial passenger aircraft that permits increased seat pitch and passenger legroom in the cabin.

It is a further object of the invention to provide a contoured class divider for a commercial passenger aircraft that allows a seat immediately behind a contoured class divider according to the invention to be located several inches closer to the seat forward of it.

It is a further object of the invention to provide a contoured class divider for a commercial passenger aircraft that includes a viewing window for permitting visual observation from a position aft of the class divider into an area of the aircraft cabin forward of the class divider.

These and other objects and advantages of the invention are achieved by providing a contoured class divider that includes a curved panel for being mounted into track fittings behind a selected row of seats. The curve of the panel closely corresponds to the shape of the back of the selected row of seats and nests into the volume behind the seatback while still allowing for adequate seatback recline. More specifically, a contoured class divider is provided for dividing an aircraft cabin according to a predetermined class arrangement and including a divider panel having a contour closely matching a contour of a forward-positioned seatback and adapted for being positioned in closely, spaced-apart relation to the seatback for providing additional space aft of the seat. At least one leg is provided for supporting the panel about an aircraft cabin deck. A viewing window is formed in the panel for providing the ability of a flight attendant to observe areas of the cabin forward of the divider.

BRIEF DESCRIPTION OF THE DRAWINGS

The present invention is best understood when the following detailed description of the invention is read with reference to the accompanying drawings, in which.

DETAILED DESCRIPTION OF THE PREFERRED EMBODIMENT

Figure 1:
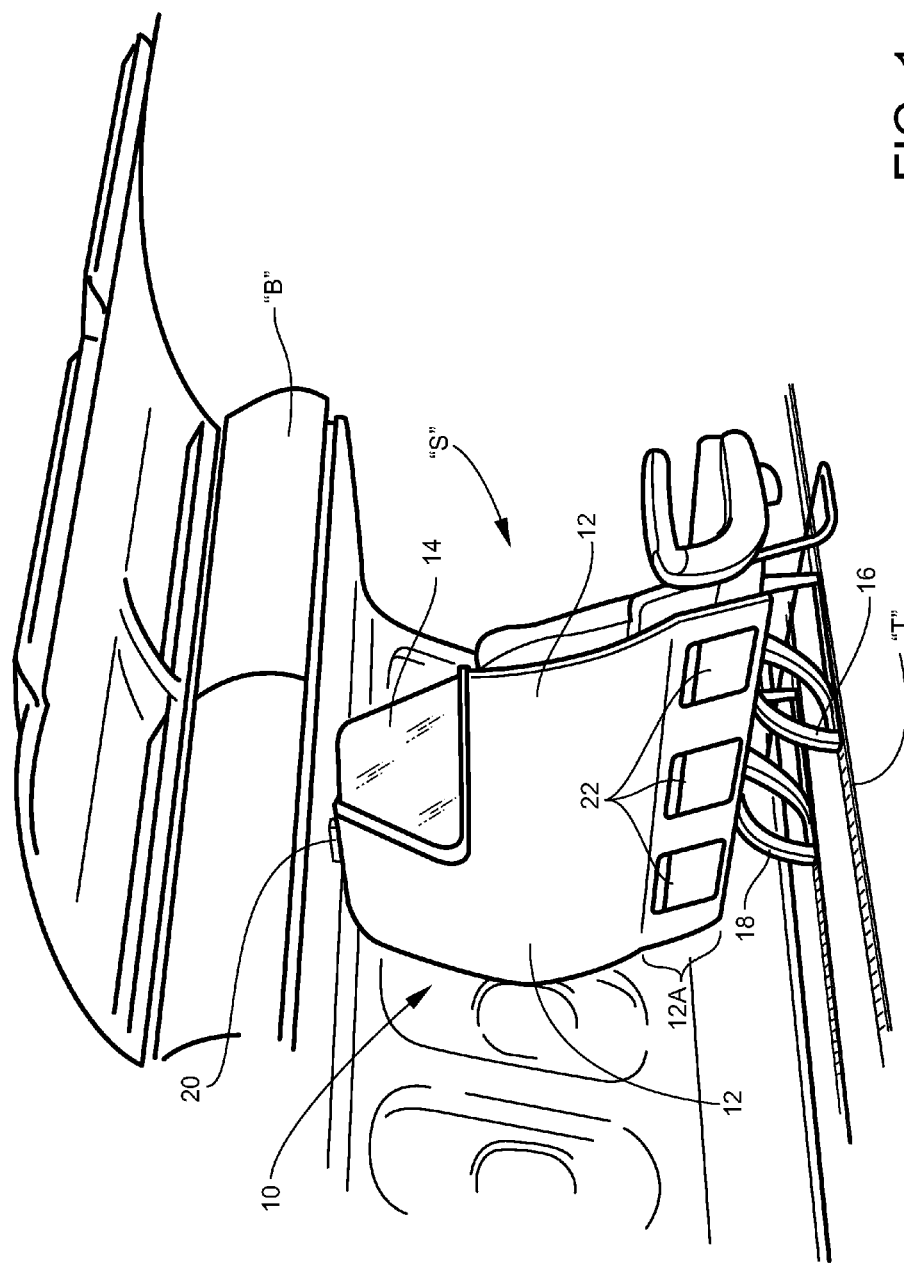
FIG. 1 is a cabin view looking forward, showing a contoured class divider according to one embodiment of the invention and forward-positioned seats.

Referring now specifically to FIG. 1 of the drawings, a contoured portside class divider 10 according to one preferred embodiment of the invention is shown positioned directly behind a seat row of two business class seats "S" such as are conventionally found in commercial aircraft cabins. Such cabins typically include both structural and decorative panels and overhead stowage bins for passenger luggage and other items. The divider 10 includes a fixed, rigid monument in the form of a panel 12 attached to floor-mounted seat tracks "T" and the overhead stowage bin "B" of the aircraft cabin. The exact attachment configuration is dependent upon aircraft type and cabin configuration. The contoured portside class divider 10 optionally includes an attendant viewing window 14 that is inset into an outer corner of the upper part of the panel 12 that can be defined by the airlines' cosmetic specifications. The window 14 may be clear or automatically dimmable.

Figure 2:
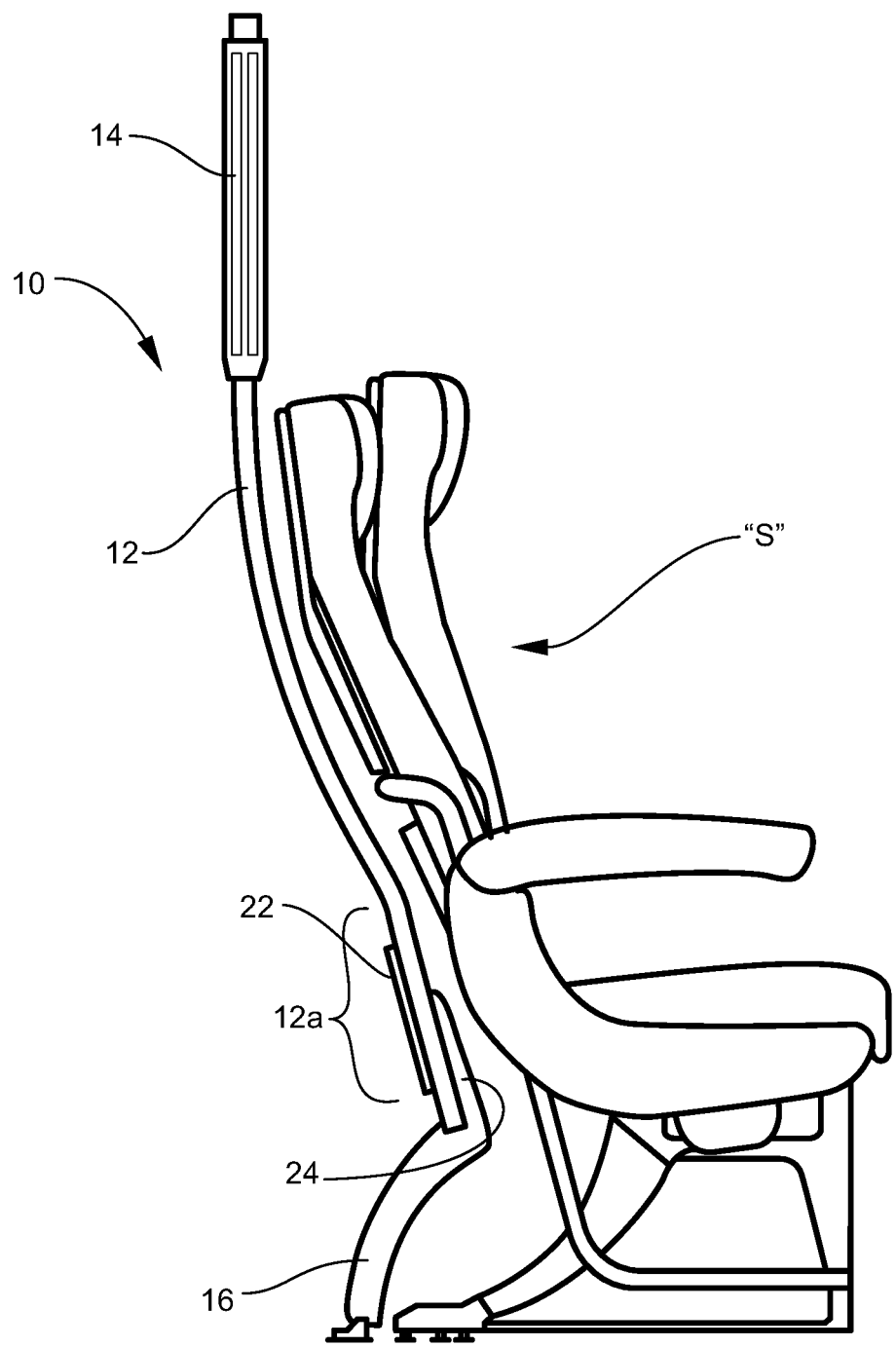
FIG. 2 is a side elevation of the divider and seats.

Referring to FIG. 2, the divider 10 utilizes space behind the seats "S" that is normally vacant with conventional class dividers but does not provide sufficient space for stowage or other uses. By forming the panel 12 to closely correspond to the contour of the seatback of the seat "S", the Head Impact Criteria (HIC) requirement is optimized for the seat immediately behind the divider 10. As shown, the panel 12 in the rear-facing direction is generally convex with a lower section 12A that is relatively flat in order to accommodate optionally supplied pockets 22 for use by occupants of aft-positioned seats. Three pockets 22 are shown reflecting that the seats behind the divider 10 are main cabin seats, which are typically arranged in groups of three. The spacing provides the ability for the aft seats (not shown) to be moved forward up to four (4) inches towards the divider 10, improving seat spacing in the cabin. The panel 12 is elevated off the floor by support legs 16, 18, allowing for stowage of passenger items under the seats "S" forward of the divider 10.

The legs 16, 18 are bowed rearwardly in a convex manner to provide a cantilevered resistance against rearward deflection of the panel 12, particularly if it is accidentally impacted by excessive recline of the seatback of the seat "S", or if pulled rearwardly by a seated passenger as an aid to rising out of an occupied seat. The top end of the divider 10 is secured against deflection by a connector 20 that attaches the divider 10 to an overhead structure below the bins "B". Therefore, both the top and bottom of the divider 10 are preferably secured against movement. Sufficient space remains between the panel 12 and the seats "S" to allow for the usual amount of seatback recline. The panel 12 also provides additional legroom for the occupants of seats aft of the divider 10.

Figure 3:
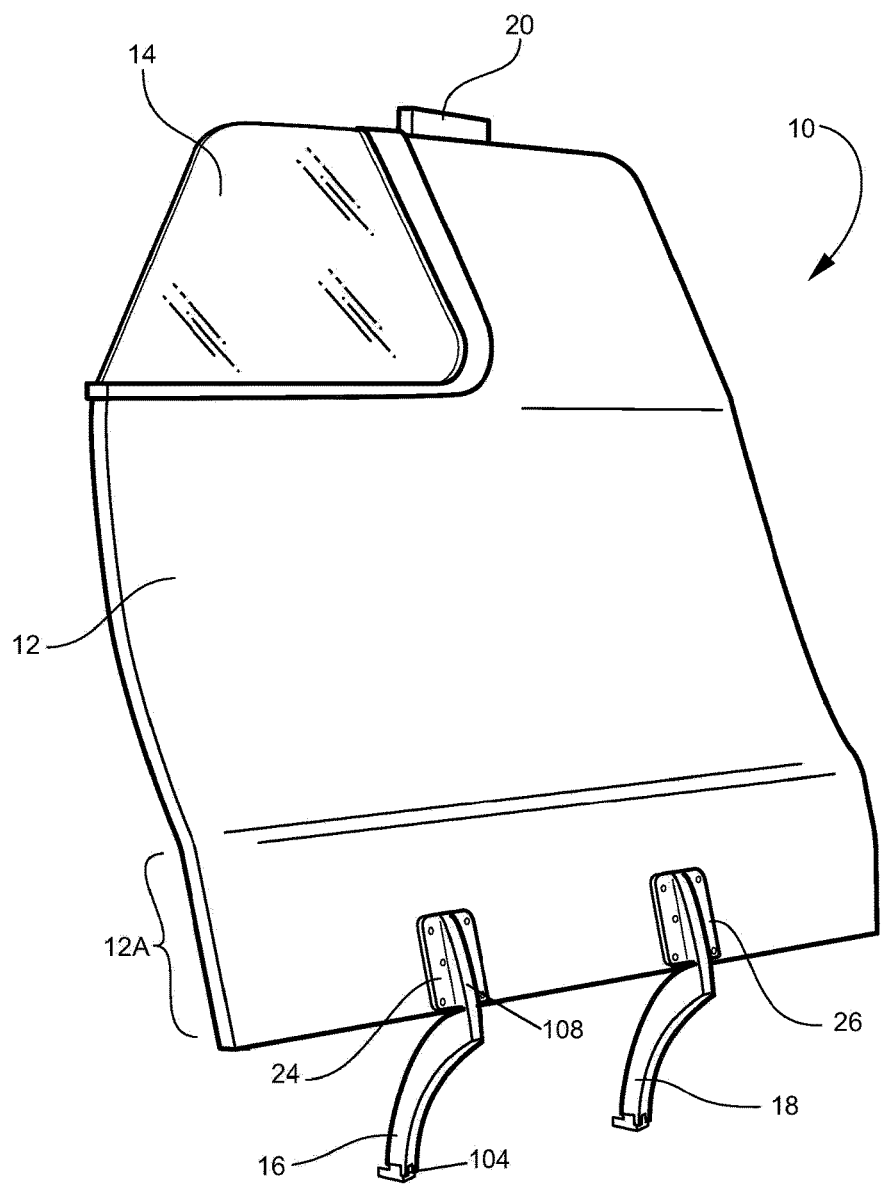
FIG. 3 is a perspective view looking aft of the divider only.
Figure 4:
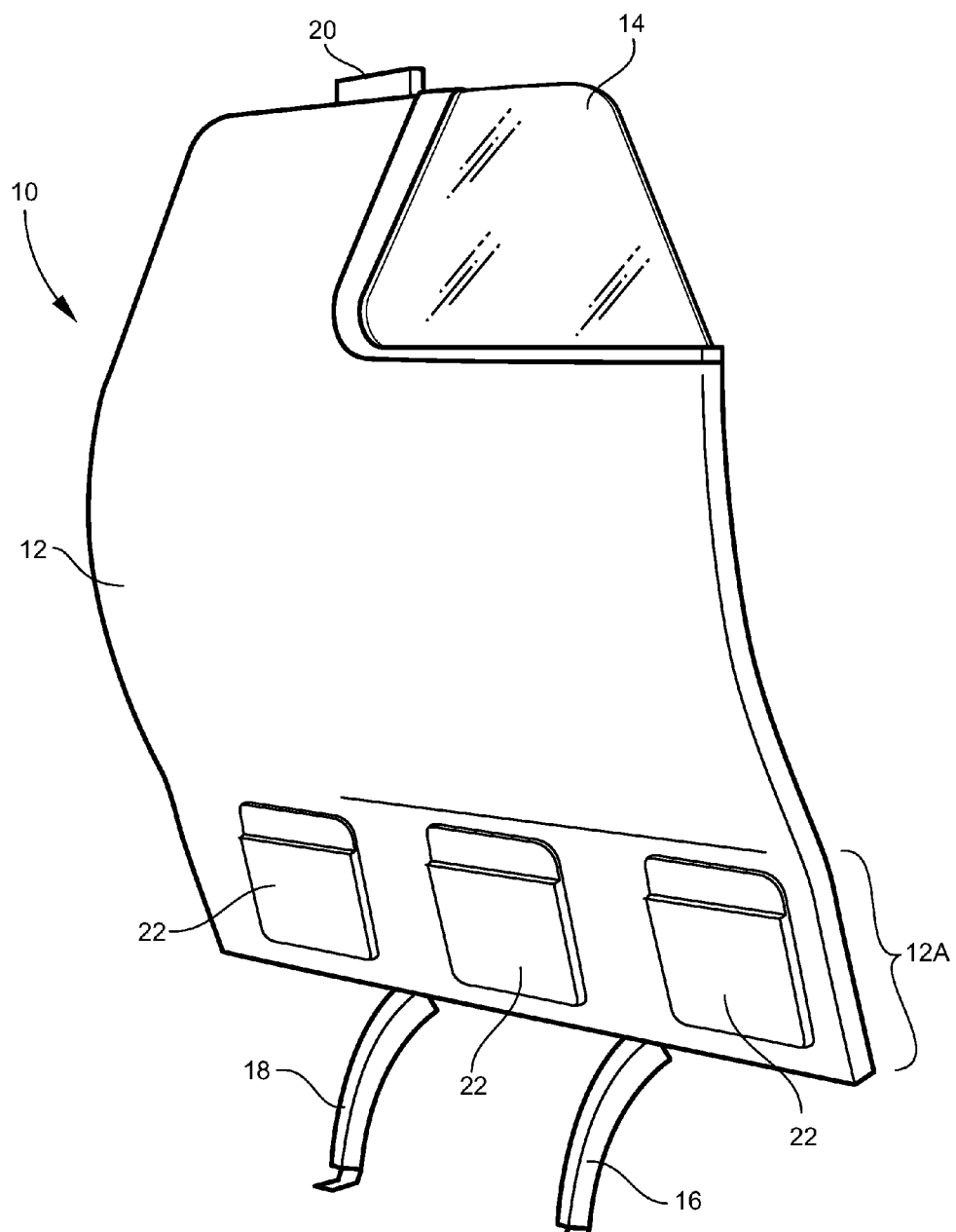
FIG. 4 is a perspective view looking forward of the divider only.

FIGS. 3 and 4, together with previously referenced FIG. 2, show the bowed configuration of the legs 16, 18. The legs 16, 18 are robustly constructed to resist rearward deflection and include respective ribbed brackets 24, 26 as shown in FIG. 3. The legs 16, 18 each include a base 104 and an upper end 108.

A starboard divider 70 having the same characteristics would be provided for use on the starboard side of the aircraft cabin.

Figure 5:
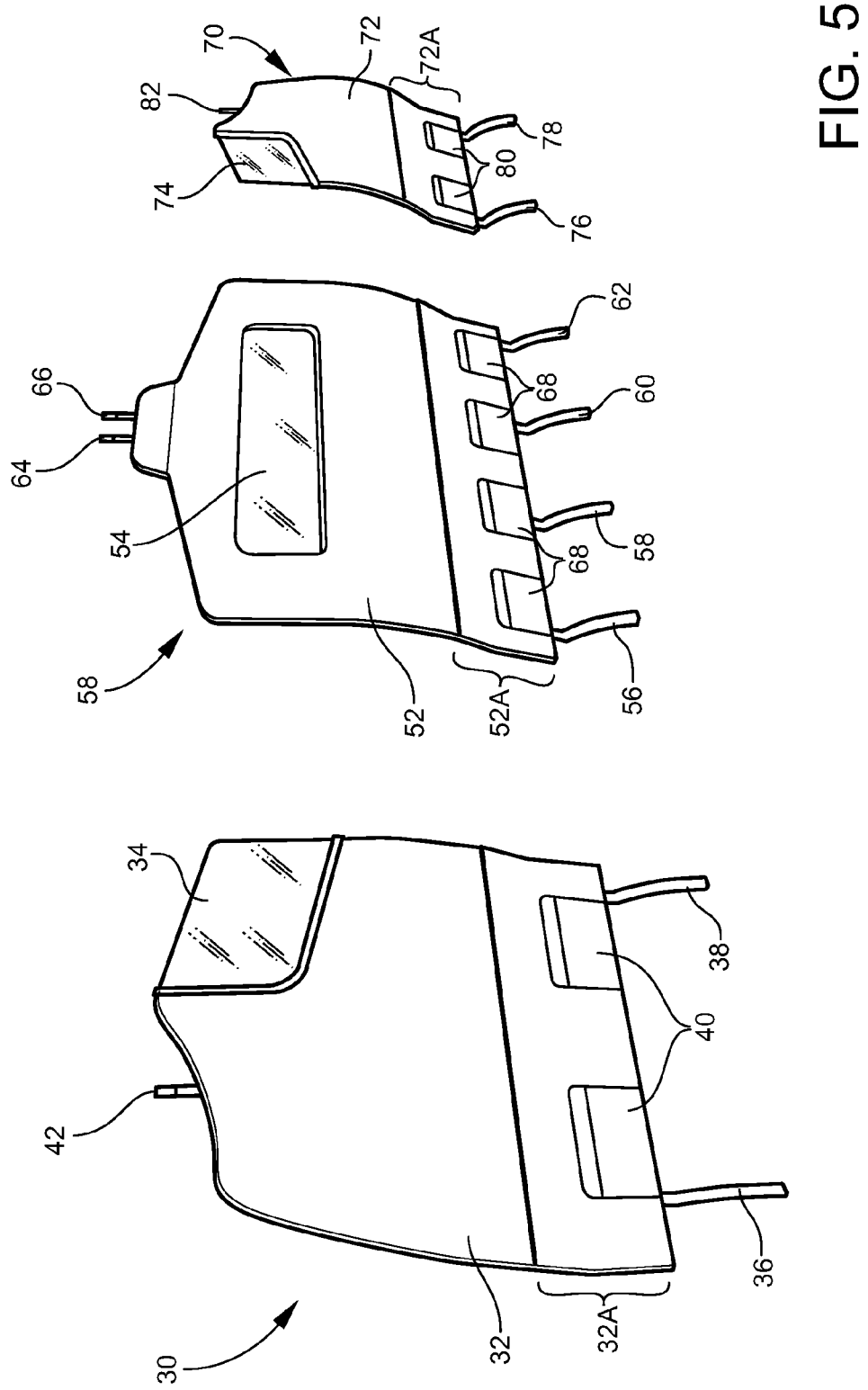
FIG. 5 is a rear perspective view looking forward of two side class dividers and a center class divider according to an alternate embodiment of the invention.

Referring now to FIG. 5, a port, center and starboard dividers according to a further embodiment of the invention are shown at reference numerals 30, 50 and 70.

Port divider 30 includes a panel 32 attached to floor-mounted seat tracks and the overhead stowage bin of the aircraft cabin in a manner similar to that shown in FIGS. 1 and 2. The exact attachment configuration is dependent upon aircraft type and cabin configuration. The divider 30 optionally includes an attendant viewing window 34 that is inset into an outer corner of the upper part of the panel 32 that can be defined by the airlines' cosmetic specifications. The window 34 may be clear or automatically dimmable. Legs 36, 38 are bowed rearwardly as shown and as described above. The panel 32 in the rear-facing direction is generally convex with a lower section 32A that is relatively flat in order to accommodate optionally supplied pockets 40 for use by occupants of aft-positioned seats. The profile of the top end of the panel 32 is curved to fit a storage bin configuration different than that shown in FIGS. 1-4, is secured against deflection by a connector 42 that attaches the divider 30 to an overhead structure, not shown.

The center divider 50 includes a panel 52 attached to floor-mounted seat tracks and the overhead stowage bin of the aircraft cabin in a manner similar to that shown in FIGS. 1 and 2. The exact attachment configuration is dependent upon aircraft type and cabin configuration. The divider 50 optionally includes an attendant viewing window 54 that is inset into an outer corner of the upper part of the panel 32 that can be defined by the airlines' cosmetic specifications. The window 54 may be clear or automatically dimmable. Legs 56, 58, 60, 62 are bowed rearwardly as shown and as described above. The panel 52 in the rear-facing direction is generally convex with a lower section 52A that is relatively flat in order to accommodate optionally supplied pockets 68 for use by occupants of aft-positioned seats. The profile of the top end of the panel 52 is secured against deflection by connectors 64, 66 that attach the divider 50 to an overhead structure, not shown.

Starboard side divider 70 includes a panel 72 attached to floor-mounted seat tracks and the overhead stowage bin of the aircraft cabin in a manner similar to that shown in FIGS. 1 and 2. The exact attachment configuration is dependent upon aircraft type and cabin configuration. The divider 70 optionally includes an attendant viewing window 74 that is inset into an outer corner of the upper part of the panel 72 that can be defined by the airlines' cosmetic specifications. The viewing window 74 may be clear or automatically dimmable. Legs 76, 78 are bowed rearwardly as shown and as described above. The panel 72 in the rear-facing direction is generally convex with a lower section 72A that is relatively flat in order to accommodate optionally supplied pockets 80 for use by occupants of aft-positioned seats. The profile of the top end of the panel 32 is curved to fit a storage bin configuration different than that shown in FIGS. 1-4, is secured against deflection by a connector 82 that attaches the divider 70 to an overhead structure, not shown.

Figure 6:
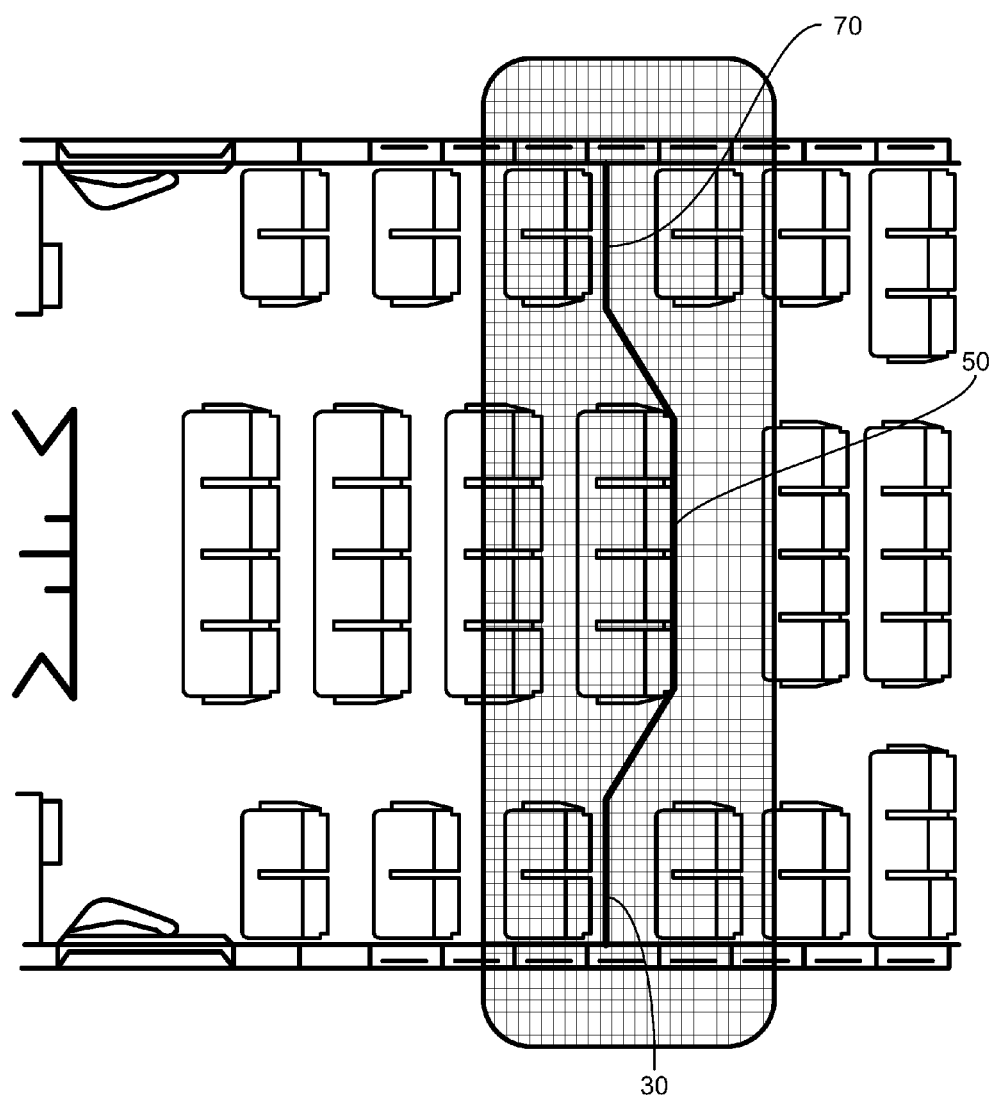
FIG. 6 is a partial plan view of an aircraft cabin showing placement of contoured class dividers according to embodiments of the invention.

As shown in FIG. 6, the port side, center and starboard side class dividers 30, 50 and 70 are positioned to divide an aircraft cabin into separate classes.

A contoured class divider according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A contoured class divider for dividing an aircraft cabin according to a predetermined class arrangement, comprising:
   (a) a panel having a top end, a lower end, and an aft-facing convex contour between the top end and the lower end;
   (b) at least one leg having an upper end attached to a front of the panel at the lower end of the panel for supporting the panel on an aircraft cabin deck, the leg having a convex, aft-facing shape extending between the upper end of the at least one leg at which the at least one leg is attached to the lower end of the panel and a base for attaching the leg to the cabin deck, the base further aft of the lower end of the panel than the upper end of the at least one leg; and (c) at least one connector positioned proximate the top end of the panel for attachment to an overhead structural element of the aircraft cabin for positioning the top end of the panel in a predetermined fixed location.

2. The contoured class divider of claim 1, wherein the has a curved side edge.

3. The contoured class divider of claim 1, wherein the class divider includes a viewing window positioned in the panel for providing a flight attendant with the ability to observe areas of the cabin through the viewing window.

4. The contoured class divider of claim 3, wherein the viewing window is asymmetrically positioned within the perimeter of the panel on a side edge of the panel relative to an opposing outboard side edge of the panel.

5. The contoured class divider of claim 1, wherein the panel includes a planar section positioned below the convex contour for supporting at least one pocket on the planar section.

6. The contoured class divider of claim 1, wherein the panel is on an aircraft cabin deck and includes a plurality of laterally-spaced legs including the at least one leg, the plurality of laterally-spaced apart legs supporting the panel on the aircraft cabin deck.

7. A contoured class divider system for dividing an aircraft cabin according to a predetermined class arrangement, comprising:
   (a) a first divider, comprising:

(i) a first panel having a top end, a lower end, and an aft-facing convex contour between the top end and the lower end of the first panel;
(ii) at least one first leg having a first upper end attached to a front of the first panel at the lower end of the first panel for supporting the first panel on an aircraft cabin deck, the at least one first leg having a convex, aft-facing shape extending between the first upper end of the at least one first leg at which the first upper end is attached to the lower end of the first panel and a base for attaching the at least one first leg to the aircraft cabin deck, the base of the at least one first leg further aft of the lower end of the first panel than the first upper end of the at least one first leg;
(iii) at least one connector positioned proximate the top end of the first panel for attachment to an overhead structural element of the aircraft cabin for positioning the top end of the panel in a predetermined fixed location; and
(iv) wherein the first panel has a curved side edge;
   (b) a second divider, comprising:
(i) a second panel having a top end, a lower end, and an aft-facing convex contour between the top end and the lower end of the second panel;
(ii) at least one second leg having a second upper end attached to a front of the second panel at the lower end of the second panel for supporting the second panel on the aircraft cabin deck, the at least one second leg having a convex, aft-facing shape extending between the second upper end of the at least one second leg at which the second upper end is attached to the lower end of the second panel and a base for attaching the at least one second leg to the aircraft cabin deck, the base of the at least one second leg further aft of the lower end of the second panel than the upper end of the at least one second leg;
(iii) at least one connector positioned proximate the top end of the second panel for attachment to an overhead structural element of the aircraft cabin for positioning the top end of the second panel in a predetermined fixed location; and
(iv) wherein the second panel has a curved side edge; and
   (c) a third divider, comprising:
(i) a third panel having a top end, a lower end, and an aft-facing convex contour between the top end and the lower end of the third panel;
(ii) at least one third leg having a third upper end attached to a front of the lower end of the third panel for supporting the third panel on an aircraft cabin deck, the at least one third leg having a convex, aft-facing shape extending between the third upper end of the at least one third leg at which the third upper end is attached to the lower end of the third panel and a base for attaching the at least one third leg to the cabin deck, the base of the at least one third leg further aft of the lower end of the third panel than the upper end of the at least one third leg;
(iii) at least one connector positioned proximate the top end of the third panel for attachment to an overhead structural element of the aircraft cabin for positioning the top end of the third panel in a predetermined fixed location.

8. The contoured class divider system of claim 7, wherein the first and second dividers are shaped corresponding to adjacent curved respective left and right fuselage walls of the cabin.

9. The contoured class divider system of claim 7, wherein the first, second and third class dividers each include a viewing window positioned in respective first, second and third panels for providing a flight attendant with the ability to observe areas of the cabin through the viewing windows.

10. The contoured class divider system of claim 9, wherein the viewing windows of the first and second class dividers are asymmetrically positioned within the perimeter of respective first and second panels on a side edge of the panels and relative to an opposing outboard side edge of the respective first and second panels.

11. The contoured class divider system of claim 7, wherein the third panel is symmetrical between a left side edge and a right side edge.

12. The contoured class divider system of claim 7, wherein the first, second and third panels include respective planar sections positioned below the convex contour for supporting at least one pocket thereon.

13. The contoured class divider system of claim 7, wherein the first, second and third panels each include a plurality of laterally-spaced legs for supporting the first, second and third panels on the aircraft cabin deck.

14. The contoured class divider system of claim 9, wherein the viewing window of the third divider is centrally positioned in the third panel.

15. The contoured class divider system of claim 9, wherein the viewing window of the third divider is centrally positioned in the third panel and is rectangular.

16. The contoured class divider of claim 1, wherein the at least one leg spaces the lower end of the panel from the aircraft cabin deck when the base is attached to the aircraft cabin deck.

\* \* \* \* \*